United States Patent
Ito

(10) Patent No.: US 6,175,430 B1
(45) Date of Patent: Jan. 16, 2001

(54) INTERPOLATING OPERATION METHOD AND APPARATUS FOR COLOR IMAGE SIGNALS

(75) Inventor: Wataru Ito, Kanagawa-ken (JP)

(73) Assignee: Fuji Photo Film Co., Ltd., Kanagawa-Ken (JP)

( * ) Notice: Under 35 U.S.C. 154(b), the term of this patent shall be extended for 0 days.

(21) Appl. No.: 09/108,196

(22) Filed: Jul. 1, 1998

(30) Foreign Application Priority Data

Jul. 2, 1997 (JP) .................................................... 9-176660
Nov. 28, 1997 (JP) .................................................. 9-328283

(51) Int. Cl.$^7$ .................................................... H04N 1/46
(52) U.S. Cl. ......................... 358/525; 358/518; 358/520; 348/234; 348/663
(58) Field of Search ..................... 358/448, 463, 358/518, 520, 525; 348/272, 273, 222, 242, 234, 235, 237, 663; 382/162

(56) References Cited

U.S. PATENT DOCUMENTS

| | | | |
|---|---|---|---|
| 4,443,821 | * 4/1984 | Kato | 386/20 |
| 5,008,752 | * 4/1991 | Nostrand | 348/581 |
| 5,046,827 | * 9/1991 | Frost et al. | 349/112 |
| 5,768,482 | * 6/1998 | Winter et al. | 395/109 |
| 5,784,502 | * 7/1998 | Inuzuka | 382/300 |
| 5,880,767 | * 3/1999 | Liu | 347/251 |
| 5,889,894 | * 3/1999 | Ito et al. | 382/300 |
| 5,905,822 | * 5/1999 | Ito et al. | 382/300 |
| 5,936,681 | * 8/1999 | Kameoka et al. | 348/625 |
| 5,953,465 | * 9/1999 | Saotome | 382/300 |
| 5,990,950 | * 11/1999 | Addison | 348/273 |
| 5,991,464 | * 11/1999 | Hsu et al. | 358/525 |

FOREIGN PATENT DOCUMENTS

| | | | |
|---|---|---|---|
| 0782327 | * 7/1997 | (EP) | H04N/1/40 |
| 0883303 | * 12/1998 | (EP) | H04N/11/20 |

* cited by examiner

Primary Examiner—Edward L. Coles
Assistant Examiner—Mark Wallerson

(57) ABSTRACT

To obtain an interpolating operation apparatus which provides an interpolation image in which the sharpness in kept high and noise due to hue variations is kept small after the interpolating operation.

For a primary image signal Sorg (R, G, B) which is inputted into an interpolating operation apparatus 30, R, G, and B color signal components, which represent each of picture elements in a color image represented by an orignal image signal, are converted into YCC luminance and color difference signal components through a first signal conversion means 31. With a cubic spline interpolating operation means 32, an interpolated luminance signal component Y' is obtained with respect to luminance signal components Y. With a B spline interpolating operation means 33, interpolated color difference signal components C1' and C2' are obtained with respect to color difference signal component C1 and C2. Then, the interpolated luminance signal component Y' and the interpolated color difference signal components C1' and C2' are converted into interpolated color signal components R', G', and B' through a second signal conversion means 34, whereby an interpolated image signal S' (R', G', B') is obtained.

23 Claims, 3 Drawing Sheets

INTERPOLATING OPERATION METHOD AND APPARATUS FOR COLOR IMAGE SIGNALS

DETAILED DESCRIPTION OF THE INVENTION

Field of the Invention

This invention relates to an interpolating operation method and apparatus for a color image signal.

Prior Art

Techniques for photoelectrically reading out an image, which has been recorded on a photographic film, in order to obtain an image signal, carrying out appropriate image processing on the image signal, and then reproducing a visible image by use of the processed image signal have heretofore been known in various fields. In image recording and reproducing systems, in which an image signal is obtained and a visible image is reproduced from the image signal, in cases where the region of interest in the visible image is to be viewed in more detail, the region of interest is often enlarged and reproduced. In such cases, if the enlargement of the image size is carried out such that the number of the image signal components of the image signal representing the enlarged image may be identical with the number of the image signal components of the original image signal representing the original image, the sharpness of the enlarged image will be recognized to be lower than the sharpness of the original image due to the visual characteristics of persons. Therefore, if the image is merely enlarged and reproduced, an enlarged image having a high sharpness cannot be obtained, and the details of the image cannot be viewed accurately.

In order for the aforesaid problems to be eliminated, a predetermined interpolating operation may be carried out on the original image signal, which has been obtained by reading out an original image, and an interpolation image signal, which is a secondary image signal and is made up of a number of image signal components different from that of the original image signal, may thereby be formed. Specifically, in cases where an enlarged image is to be reproduced, an interpolation image signal, which is made up of a number of image signal components larger than that of the original image signal, may be formed from the interpolating operation. A visible image may then be reproduced from the interpolation image signal. In this manner, the sharpness of the enlarged image can be prevented from becoming low.

As the interpolating operation methods for carrying out interpolating operations on image signals, various methods have heretofore been proposed. Among such methods, the method using third-order spline interpolating functions is popular. With the interpolating operation method using the third-order spline interpolating functions, digital original image signal components $\{Z_k\}$ in each section are connected by a third-order function $\{f_k\}$, and the value of $f_k$ corresponding to a position, at which an interpolation point is set, (i.e., a setting position in each section) is taken as the value of the interpolated image signal component.

The interpolating operations, which pass through the original image signal in the manner described above, can yield an image having a comparatively high sharpness. As such interpolating operations, cubic spline interpolating operations, and the like, are known. How the cubic spline interpolating operations are carried out will be described hereinbelow.

FIG. 2 is an explanatory graph showing how interpolated image signal components are obtained with a cubic spline interpolating operation from original image signal components, which are sampled with a period of an equal interval and represent sampling points (picture elements) arrayed in one direction. As illustrated in FIG. 2, the image signal components (the original image signal components), which have been detected as digital signal components from an original image and represent a series of picture elements $X_{k-2}, X_{k-1}, X_k, X_{k+1}, X_{k+2}, \ldots$, are respectively represented by $Z_{k-2}, Z_{k-1}, Z_k, Z_{k+1}, Z_{k+2}, \ldots$. A third-order spline interpolating function is set for each of sections $X_{k-2} \sim X_{k-1}$, $X_{k-1} \sim X_k$, $X_k \sim X_{k+1}$, and $X_{k+1} \sim X_{k+2}$. The spline interpolating functions corresponding to the respective sections are represented by $f_{k-2}, f_{k-1}, f_k, f_{k+1}$, and $f_{k+2}$. The interpolating functions are the third-order functions, in which the position in each section serves as a variable.

Firstly, how the interpolating operation is carried out when a point taken for interpolation (hereinbelow referred to as the interpolation point) $X_p$ falls within the section $X_k \sim X_{k+1}$ will be described hereinbelow. The spline interpolating function $f_k$ corresponding to the section $X_k \sim X_{k+1}$ is represented by Formula (1) shown below.

$$f_k(x) = A_k x^3 + B_k x^2 + C_k x + D_k \tag{1}$$

In the cubic spline interpolating operation, it is necessary that the spline interpolating function $f_k$ passes through the original sampling points (picture elements), and that the first-order differential coefficient of the spline interpolating function $f_k$ is continuous between adjacent sections. Therefore, it is necessary for Formulas (2), (3), (4), and (5) shown below to be satisfied.

$$f_k(X_k) = Z_k \tag{2}$$

$$f_k(X_{k+1}) = Z_{k+1} \tag{3}$$

$$f_k'(X_k) = f_{k-1}'(X_k) \tag{4}$$

$$f_k'(X_{k+1}) = f_{k+1}'(X_{k+1}) \tag{5}$$

In these formulas, $f_k'$ represents the first-order differentiation $(3A_k x^2 + 2B_k x + C_k)$ of the function $f_k$.

In the strict sense, the cubic spline interpolating operation contains the continuity conditions of the second-order differential coefficient. However, with continuity conditions of the second-order differential coefficient, the operation formulas become complicated. Therefore, the cubic spline interpolating operation is popularly carried out in the form simplified in the manner described above.

Also, in the cubic spline interpolating operation, it is necessary for the first-order differential coefficient at the picture element $X_k$ to satisfy the condition with respect to the picture elements $X_{k-1}$ and $X_{k+1}$, which are located before and after the picture element $X_k$, in that the first-order differential coefficient at the picture element $X_k$ should coincide with the gradient $(Z_{k+1} - Z_{k-1})/(X_{k+1} - X_{k-1})$ of the image signal components $Z_{k-1}$ and $Z_{k+1}$ representing the picture elements $X_{k-1}$ and $X_{k+1}$. Therefore, it is necessary for Formula (6) shown below to be satisfied.

$$f_k'(X_k) = (Z_{k+1} - Z_{k-1})/(X_{k+1} - X_{k-1}) \tag{6}$$

Also, it is necessary for the first-order differential coefficient at the picture element $X_{k+1}$ to satisfy the condition with respect to the picture elements $X_k$ and $X_{k+2}$, which are located before and after the picture element $X_{k+1}$, in that the first-order differential coefficient at the picture element $X_{k+1}$ should coincide with the gradient $(Z_{k+2}-Z_k)/(X_{k+2}-X_k)$ of the image signal components $Z_k$ and $Z_{k+2}$ representing the picture elements $X_k$ and $X_{k+2}$. Therefore, it is necessary for Formula (7) shown below to be satisfied.

$$f_k'(X_{k+1})=(Z_{k+2}-Z_k)/(X_{k+2}-X_k) \quad (7)$$

It is herein assumed that the interval (i.e., the lattice interval) of each of sections $X_{k-2} \sim X_{k-1}$, $X_{k-1} \sim X_k$, $X_k \sim X_{k+1}$, and $X_{k+1} \sim X_{k+2}$ is equal to 1, and the position of the interpolation point $X_p$, which is taken from the picture element $X_k$ toward the picture element $X_{k+1}$, is represented by t ($0 \leq t \leq 1$). In such cases, from Formulas (1) through (7), the formulas shown below obtain.

$$f_k(0)=D_k=Z_k$$

$$f_k(1)=A_k+B_k+C_k+D_k=Z_{k+1}$$

$$f_k'(0)=C_k=(Z_{k+1}-Z_{k-1})/2$$

$$f_k'(1)=3A_k+2B_k+C_k=(Z_{k+2}-Z_k)/2$$

Therefore, the formulas shown below obtain.

$$A_k=(Z_{k+2}-3Z_{k+1}+3Z_k-Z_{k-1})/2$$

$$B_k=(-Z_{k+2}+4Z_{k+1}-5Z_k+2Z_{k-1})/2$$

$$C_k=(Z_{k+1}-Z_{k-1})/2$$

$$D_k=Z_k$$

As described above, the variable conversion of X=t is carried out, and therefore the spline interpolating function $f_k(x)$ is represented by the formula shown below.

$$f_k(x)=f_k(t)$$

Therefore, an interpolated image signal component $Z_p$ corresponding to the interpolation point $X_p$ may be represented by Formula (8) shown below.

$$Z_p=f_k(t)=A_k t^3+B_k t^2+C_k t+D_k \quad (8)$$

Substituting the coefficients $A_k$, $B_k$, $C_k$, and $D_k$ into Formula (8) yields $$Z_p = \{(Z_{k+2} - 3Z_{k+1} + 3Z_k - Z_{k-1})/2\}t^3 +$$
$$\{(-Z_{k+2} + 4Z_{k+1} - 5Z_k + 2Z_{k-1})/2\}t^2 +$$
$$\{(Z_{k+1} - Z_{k-1})/2\}t + Z_k$$

Arranging this formula with respect to the image signal components $Z_{k-1}$, $Z_k$, $Z_{k+1}$, and $Z_{k+2}$ yields Formula (9) shown below.

$$Z_p = \{(-t^3 + 2t^2 - t)/2\}Z_{k-1} + \quad (9)$$
$$\{(3t^3 - 5t^2 + 2)/2\}Z_k +$$
$$\{(-3t^3 + 4t^2 + t)/2\}Z_{k+1} +$$
$$\{(t^3 - t^2)/2\}Z_{k+2}$$

The coefficients for the image signal components $Z_{k-1}$, $Z_k$, $Z_{k+1}$, and $Z_{k+2}$ are referred to as the interpolation coefficients $c_{k-1}$, $c_k$, $c_{k+1}$, and $c_{k+2}$. Specifically, the interpolation coefficients $c_{k-1}$, $c_k$, $c_{k+1}$, and $c_{k+2}$, which respectively correspond to the image signal components $Z_{k-1}$, $Z_k$, $Z_{k+1}$, and $Z_{k+2}$ in Formula (9), may be represented by the formulas shown below.

$$c_{k-1}=(-t^3+2t^2-t)/2$$

$$c_k=(3t^3-5t^2+2)/2$$

$$c_{k+1}=(-3t^3+4t^2+t)/2$$

$$c_{k+2}=(t^3-t^2)/2$$

The operations described above are repeated for the sections $X_{k-2} \sim X_{k-1}$, $X_{k-1} \sim X_k$, $X_k \sim X_{k+1}$, and $X_{k+1} \sim X_{k+2}$. In this manner, an interpolation image signal can be obtained, which is made up of image signal components occurring at intervals different from those of the image signal components of the entire original image signal.

As described above, in the cubic spline interpolating operation, it is necessary that the spline interpolating function passes through the original sampling points (picture elements), and that the first-order differential coefficient of the spline interpolating function is continuous between adjacent sections. With the interpolating function for the cubic spline interpolating operation, the interpolation image signal for use in the reproduction of a secondary image (i.e., the image obtained from the interpolating operation), which has a comparatively high sharpness, is obtained. On the other hand, as for a portion in the original image, at which the change in density is gentle, the interpolating operation should preferably be carried out such that a secondary image, in which the sharpness is comparatively low and which is smooth, may be obtained. As the interpolating function for obtaining the interpolation image signal representing the secondary image, in which the sharpness is comparatively low and which is smooth, for example, a B spline interpolating operation function is known. In the B spline interpolating operation, the spline interpolating function need not pass through the original sampling points (picture elements), and it is necessary that the first-order differential coefficient and the second-order differential coefficient {represented by f"(X)} of the spline interpolating function are continuous between adjacent sections.

Specifically, in Formula (1), $$f_k(x)=A_k x^3+B_k x^2+C_k x+D_k \quad (1)$$

the conditions shown below should be satisfied.

$$f_k'(X_k)=f_{k-1}'(X_k) \quad (4)$$

$$f_k'(X_{k+1})=f_{k+1}'(X_{k+1}) \quad (5)$$

$$f_k''(X_k)=f_{k-1}''(X_k) \quad (10)$$

$$f_k''(X_{k+1})=f_{k+1}''(X_{k+1}) \quad (11)$$

Also, it is necessary for the first-order differential coefficient at the picture element $X_k$ to satisfy the condition with respect to the picture elements $X_{k-1}$ and $X_{k+1}$, which are located before and after the picture element $X_k$, in that the first-order differential coefficient at the picture element $X_k$ should coincide with the gradient $(Z_{k+1}-Z_{k-1})/(X_{k+1}-X_{k-1})$ of the image signal components $Z_{k-1}$ and $Z_{k+1}$ representing the picture elements $X_{k-1}$ and $X_{k+1}$. Therefore, it is necessary for Formula (6) shown below to be satisfied.

$$f_k'(X_k)=(Z_{k+1}-Z_{k-1})/(X_{k+1}-X_{k-1}) \quad (6)$$

Further, it is necessary for the first-order differential coefficient at the picture element $X_{k+1}$ to satisfy the condition with respect to the picture elements $X_k$ and $X_{k+2}$, which are located before and after the picture element $X_{k+1}$, in that the first-order differential coefficient at the picture element $X_{k+1}$ should coincide with the gradient $(Z_{k+2}-Z_k)/(X_{k+2}-X_k)$ of the image signal components $Z_k$ and $Z_{k+2}$ representing the picture elements $X_k$ and $X_{k+2}$. Therefore, it is necessary for Formula (7) shown below to be satisfied.

$$f_k'(X_{k+1})=(Z_{k+2}-Z_k)/(X_{k+2}-X_k) \quad (7)$$

In general, the function f(X) may be approximately represented by Formula (12) shown below.

$$f(X)=f(0)+f'(0)X+\{f''(0)/2\}X^2 \quad (12)$$

It is herein assumed that the interval (i.e., the lattice interval) of each of sections $X_{k-2} \sim X_{k-1}$, $X_{k-1} \sim X_k$, $X_k \sim X_{k+1}$, and $X_{k+1} \sim X_{k+2}$ is equal to 1, and the position of the interpolation point $X_p$, which is taken from the picture element $X_k$ toward the picture element $X_{k+1}$, is represented by t ($0 \leq t \leq 1$). In such cases, from Formulas (1), (4), (5), (6), (7), (10), (11), and (12), the formulas shown below obtain.

$$f_k'(0)=C_k=(Z_{k+1}-Z_{k-1})/2$$

$$f_k'(1)=3A_k+2B_k+C_k=(Z_{k+2}-Z_k)/2$$

$$f_k''(0)=Z_{k+1}-2Z_k+Z_{k-1}=2B$$

Therefore, the formulas shown below obtain.

$$A_k=(Z_{k+2}-3Z_{k+1}+3Z_k-Z_{k-1})/6$$

$$B_k=(Z_{k+1}-2Z_k+Z_{k-1})/2$$

$$C_k=(Z_{k+1}-Z_{k-1})/2$$

Since $D_k$ is unknown, it is represented by the formula $$D_k=(D_1 Z_{k+2}+D_2 Z_{k+1}+D_3 Z_k+D_4 Z_{k-1})/6$$

As described above, the variable conversion of X=t is carried out, and therefore the spline interpolating function $f_k(x)$ is represented by the formula shown below.

$$f_k(x)=f_k(t)$$

Therefore, $$f_k(t) = \{(Z_{k+2} - 3Z_{k+1} + 3Z_k - Z_{k-1})/6\}t^3 +$$
$$\{(Z_{k+1} - 2Z_k + Z_{k-1})/2\}t^2 +$$
$$\{(Z_{k+1} - Z_{k-1})/2\}t +$$
$$(D_1 Z_{k+2} + D_2 Z_{k+1} + D_3 Z_k + D_4 Z_{k-1})/6$$

Arranging this formula with respect to the image signal components $Z_{k-1}$, $Z_k$, $Z_{k+1}$, and $Z_{k+2}$ yields Formula (13) shown below.

$$f_k(t) = \{(-t^3 + 3t^2 - 3t + D_4)/6\}Z_{k-1} + \quad (13)$$
$$\{(3t^3 - 6t^2 + D_3)/6\}Z_k +$$
$$\{(-3t^3 + 3t^2 + 3t + D_2)/6\}Z_{k+1} +$$
$$\{(t^3 + D_1)/6\}Z_{k+2}$$

If t is set to be t=1, the formula shown below will obtain.

$$f_k(1)=\{(D_4-1)/6\}Z_{k-1}+\{(D_3-3)/6\}Z_k+\{(D_2+3)/6\}Z_{k+1}+\{(D_1+1)/6\}Z_{k+2}$$

As for the section $X_{k+1} \sim X_{k+2}$, as in Formula (13), Formula (14) shown below obtains.

$$f_{k+1}(t) = \{(-t^3 + 3t^2 - 3t + D_4)/6\}Z_k + \quad (14)$$
$$\{(3t^3 - 6t^2 + D_3)/6\}Z_{k+1} +$$
$$\{(-3t^3 + 3t^2 + 3t + D_2)/6\}Z_{k+2} +$$
$$\{(t^3 + D_1)/6\}Z_{k+3}$$

If t is set to be t=0, the formula shown below will obtain.

$$f_{k+1}(0)=(D_4/6)Z_k+(D_3/6)Z_{k+1}+(D_2/6)Z_{k+2}+(D_1/6)Z_{k+3}$$

From the continuity condition $\{f_k(1)=f_{k+1}(0)\}$ and the condition in that the coefficients corresponding to the respective original image signal components are equal to each other, $D_4-1=0$, $D_3-3=D_4$, $D_2+3=D_3$, $D_1+1=D_2$, and $D_1=0$. Therefore, $$D_k=(Z_{k+1}+4Z_k+Z_{k-1})/6$$

Accordingly, Formula (15) shown below obtains.

$$Z_p = f_k(t) = \{(-t^3 + 3t^2 - 3t + 1)/6\}Z_{k-1} + \quad (15)$$
$$\{(3t^3 - 6t^2 + 4)/6\}Z_k +$$
$$\{(-3t^3 + 3t^2 + 3t + 1)/6\}Z_{k+1} +$$
$$(t^3/6)Z_{k+2}$$

Therefore, the interpolation coefficients $b_{k-1}$, $b_k$, $b_{k+1}$, and $b_{k+2}$, which respectively correspond to the image signal components $Z_{k-1}$, $Z_k$, $Z_{k+1}$, and $Z_{k+2}$, may be represented by the formulas shown below.

$$b_{k-1}=(-t^3+3t^2-3t+1)/6$$

$$b_k=(3t^3-6t^2+4)/6$$

$$b_{k+1}=(-3t^3+3t^2+3t+1)/6$$

$$b_{k+2}=t^3/6$$

The operations described above are repeated for the sections $X_{k-2} \sim X_{k-1}$, $X_{k-1} \sim X_k$, $X_k \sim X_{k+1}$, and $X_{k+1} \sim X_{k+2}$. In this manner, an interpolation image signal can be obtained, which is made up of image signal components occurring at intervals different from those of the image signal components of the entire original image signal.

In this manner, in cases where a secondary image (an interpolation image) having a high sharpness is to be reproduced, for example, the cubic spline interpolating operation may be used. In cases where a secondary image, which has a low sharpness and is smooth, is to be reproduced, for example, the B spline interpolating operation may be used.

Problems to be Solved by the Invention

As for a color image, in cases where the size of the color image is to be enlarged or reduced by carrying out an interpolating operation on the image signal representing the color image, the interpolating operation described above has heretofore been carried out on each of R, G, and B color signal components, which represent each of picture elements in the color image. However, in cases where the cubic spline interpolating operation process, which attaches importance to sharpness, is employed, overshooting and undershooting with patterns varying for the R, G, and B colors occur, and deviations in hue occur to different directions and in different amounts at the respective picture elements. In the visible image obtained from such an interpolating operation, the deviations in hue appear as noise.

Also, in cases where a flesh-color region, such as a pattern of a face of a person, is embedded in the image, it is desired that graininess is not perceptible in the flesh-color region in the visible image obtained from the interpolating operation.

In view of the above, the primary object of the present invention is to provide an interpolating operation method for a color image signal, wherein the size of a color image is enlarged or reduced with an interpolating operation such that image sharpness may be kept high and noise may not occur after the interpolating operation, and an apparatus for carrying out the method. Another object of the present invention is to provide an interpolating operation method for a color image signal, wherein the size of a color image is enlarged or reduced with an interpolating operation such that, in cases where a flesh-color region is embedded in the image, the image quality of the flesh-color region may be kept good and graininess may not become perceptible in the flesh-color region, and an apparatus for carrying out the method.

Means for Solving the Problems

The present invention provides an interpolating operation method for a color image signal, wherein an interpolating operation is carried out on an original image signal, which is made up of a series of image signal components representing picture elements in a color image, an interpolation image signal being obtained from the interpolating operation, the interpolation image signal being made up of a series of image signal components, which occur at intervals different from those of the image signal components of the original image signal, the method comprising the steps of:

i) converting R, G, and B color signal components, which represent each of the picture elements in the color image represented by the original image signal, into a luminance signal component and a color difference signal component, which represent each of the picture elements in the color image, ii) obtaining an interpolated luminance signal component by employing an interpolating operation process, which attaches importance to sharpness, with respect to the thus obtained luminance signal components, which represent the picture elements in the color image, iii) obtaining an interpolated color difference signal component by employing an interpolating operation process, which attaches importance to stability, with respect to the thus obtained color difference signal components, which represent the picture elements in the color image, and iv) converting the interpolated luminance signal component and the interpolated color difference signal component into R, G, and B color signal components,
an interpolation image signal, which is composed of the R, G, and B color signal components having been obtained from the conversion of the interpolated luminance signal component and the interpolated color difference signal component, being thereby obtained.

The present invention also provides an interpolating operation method for a color image signal, wherein an interpolating operation is carried out on an original image signal, which is made up of a series of image signal components representing picture elements in a color image, an interpolation image signal being obtained from the interpolating operation, the interpolation image signal being made up of a series of image signal components, which occur at intervals different from those of the image signal components of the original image signal, the method comprising the steps of:

i) converting R, G, and B color signal components, which represent each of the picture elements in the color image represented by the original image signal, into a luminance signal component and a color difference signal component, which represent each of the picture elements in the color image, ii) obtaining an interpolated luminance signal component by:

a) employing an interpolating operation process, which attaches importance to stability, with respect to the thus obtained luminance signal components, which correspond to picture elements representing flesh color among the picture elements in the color image, and b) employing an interpolating operation process, which attaches importance to sharpness, with respect to the thus obtained luminance signal components, which correspond to picture elements other than the picture elements representing flesh color among the picture elements in the color image, iii) obtaining an interpolated color difference signal component by employing an interpolating operation process, which attaches importance to stability, with respect to the thus obtained color difference signal components, which represent the picture elements in the color image, and iv) converting the interpolated luminance signal component and the interpolated color difference signal component into R, G, and B color signal components,
an interpolation image signal, which is composed of the R, G, and B color signal components having been obtained from the conversion of the interpolated luminance signal component and the interpolated color difference signal component, being thereby obtained.

In each of the interpolating operation methods for a color image signal in accordance with the present invention, the interpolating operation process, which attaches importance to sharpness, should preferably be the process utilizing a cubic spline interpolating operation, and the interpolating operation process, which attaches importance to stability, should preferably be the process utilizing a B spline interpolating operation.

The present invention further provides an interpolating operation apparatus for a color image signal, wherein an interpolating operation is carried out on an original image signal, which is made up of a series of image signal components representing picture elements in a color image, an interpolation image signal being obtained from the interpolating operation, the interpolation image signal being made up of a series of image signal components, which occur at intervals different from those of the image signal components of the original image signal, the apparatus comprising:

i) a first conversion means for converting R, G, and B color signal components, which represent each of the picture elements in the color image represented by the original image signal, into a luminance signal component and a color difference signal component, which represent each of the picture elements in the color image, ii) a luminance and color difference signals interpolating operation means for:

obtaining an interpolated luminance signal component by employing an interpolating operation process, which attaches importance to sharpness, with respect to the thus obtained luminance signal components, which represent the picture elements in the color image, and obtaining an interpolated color difference signal component by employing an interpolating operation process, which attaches importance to stability, with respect to the thus obtained color difference signal components, and iii) a second conversion means for converting the interpolated luminance signal component and the interpolated color difference signal component into R, G, and B color signals, an interpolation image signal, which is composed of the R, G, and B color signal components having been obtained from the conversion carried out by the second conversion means, being thereby obtained.

The present invention still further provides an interpolating operation apparatus for a color image signal, wherein an interpolating operation is carried out on an original image signal, which is made up of a series of image signal components representing picture elements in a color image, an interpolation image signal being obtained from the interpolating operation, the interpolation image signal being made up of a series of image signal components, which occur at intervals different from those of the image signal components of the original image signal, the apparatus comprising:

i) a first conversion means for converting R, G, and B color signal components, which represent each of the picture elements in the color image represented by the original image signal, into a luminance signal component and a color difference signal component, which represent each of the picture elements in the color image, ii) a luminance and color difference signals interpolating operation means for:

obtaining an interpolated luminance signal component by:

a) employing an interpolating operation process, which attaches importance to stability, with respect to the thus obtained luminance signal components, which correspond to picture elements representing flesh color among the picture elements in the color image, and b) employing an interpolating operation process, which attaches importance to sharpness, with respect to the thus obtained luminance signal components, which correspond to picture elements other than the picture elements representing flesh color among the picture elements in the color image, and obtaining an interpolated color difference signal component by employing an interpolating operation process, which attaches importance to stability, with respect to the thus obtained color difference signal components, which represent the picture elements in the color image, and iii) a second conversion means for converting the interpolated luminance signal component and the interpolated color difference signal component into R, G, and B color signal components, an interpolation image signal, which is composed of the R, G, and B color signal components having been obtained from the conversion carried out by the second conversion means, being thereby obtained.

In each of the interpolating operation apparatuses for a color image signal in accordance with the present invention, the luminance and color difference signals interpolating operation means should preferably employ a cubic spline interpolating operation as the interpolating operation process, which attaches importance to sharpness, and a B spline interpolating operation as the interpolating operation process, which attaches importance to stability.

The cubic spline interpolating operation is an ordinary interpolating operation, which attaches importance to sharpness. Also, the B spline interpolating operation is an ordinary interpolating operation, which attaches importance to stability. The interpolating operation process, which attaches importance to sharpness, is the one which emphasizes the discontinuity of the signal values when an image signal component is interpolated from the original signal components. The interpolating operation process, which attaches importance to stability, is the one which ensures the continuity of the signal values when an image signal component is interpolated from the original signal components.

Advantages of the Invention

With the interpolating operation method and apparatus for a color image signal in accordance with the present invention, the R, G, and B color signal components, which represent each of the picture elements in the color image represented by the original image signal, are converted into the luminance signal component and the color difference signal component. With respect to the thus obtained luminance signal components representing the picture elements in the color image, the interpolating operation process, which attaches importance to sharpness, is employed, and the interpolated luminance signal component is thereby obtained. With respect to the thus obtained color difference signal components representing the picture elements in the color image, the interpolating operation process, which attaches importance to stability, is employed, and the interpolated color difference signal component is thereby obtained. The interpolated luminance signal component and the interpolated color difference signal component are converted into the R, G, and B color signal components. In this manner,the interpolation image signal, which is composed of the R, G, and B color signal components having been obtained from the conversion of the interpolated luminance signal component and the interpolated color difference signal component, is obtained. Therefore, the problems can be prevented from occurring in that deviations in hue occur to different directions and in different amounts at the respective picture elements in the visible image, which is obtained from the interpolating operation, due to the conventional technique, wherein an interpolated color signal component is calculated with the interpolating operation process, which attaches importance to sharpness, with respect to each of the R, G, and B color signal components. Further, the image sharpness depends upon a change in luminance. With the interpolating operation method and apparatus for a color image signal in accordance with the present invention, wherein the interpolating operation process, which attaches importance to sharpness, is carried out with respect to the luminance signal components, a high level of sharpness can be kept.

In this manner, the image size can be enlarged or reduced such that the sharpness may be kept high and noise due to hue variations may be kept small.

Particularly, in cases where a flesh-color region, such as a pattern of a face of a person, is embedded in the image to be processed, the interpolating operation process, which attaches importance to stability, is employed with respect to the luminance signal components and the color difference signal components, which correspond to the picture elements belonging to the flesh-color region. Also, the interpolating operation process, which attaches importance to sharpness, is employed with respect to the luminance signal components, which correspond to picture elements other than the picture elements belonging to the flesh-color region. Further, the interpolating operation process, which attaches importance to stability, is employed with respect to the color difference signal components, which correspond to the picture elements other than the picture elements belonging to the flesh-color region. In this manner, the image size can be enlarged or reduced such that noise due to hue variations may be kept small and the graininess in the flesh-color region may be kept imperceptible.

Embodiments

The present invention will herein below be described in further detail with respect to its embodiments.

FIG. 1 is a schematic block diagram showing an image reproducing system provided with an interpolating operation apparatus 30, which is a first embodiment of the interpolating operation apparatus for carrying out the interpolating operation method for a color image signal in accordance with the present invention. With reference to FIG. 1, the image reproducing system comprises an image signal storing device 10 for storing an image signal representing an image, and an image processing apparatus 20 for carrying out predetermined signal processing on the color image signal (hereinbelow referred to as the primary image signal or the original image signal) Sorg(R,G,B), which is received from the image signal storing device 10, such that an image signal conforming to a predetermined reproduction size may be obtained. The image reproducing system also comprises an image reproducing means 40 for reproducing a visible image of the predetermined reproduction size from an image signal (herein below referred to as the secondary image signal or the interpolation image signal) S'(R',G',B'), which has been obtained from the predetermined signal processing carried out by the image processing apparatus 20. The image reproducing means 40 may be a CRT display device, a printer, or the like.

The image processing apparatus 20 carries out the signal processing on the primary image signal Sorg, such that an image signal conforming to, for example, one of various sizes (an L size, a postcard size, an A4 size, and the like) of photographic paper for image reproduction may be obtained. The image processing apparatus 20 is provided with the interpolating operation apparatus 30 in accordance with the present invention, which carries out an interpolating operation for obtaining the secondary image signal (the interpolation image signal) made up of a number of image signal components different from that of the image signal components of the primary image signal Sorg when the image size is to be enlarged or reduced.

The primary image signal Sorg used in this embodiment is made up of a series of digital image signal components $(R_{k-2}, G_{k-2}, B_{k-2})$, $(R_{k-1}, G_{k-1}, B_{k-1})$, $(R_k, G_k, B_k)$, $(R_{k+1}, G_{k+1}, B_{k+1})$, $(R_{k+2}, G_{k+2}, B_{k+2})$, ... respectively corresponding to sampling points (picture elements) $X_{k-2}$, $X_{k-1}$, $X_k$, $X_{k+1}$, $X_{k+2}$ ..., which are sampled with a period of an equal interval and arrayed in one direction.

The interpolating operation apparatus 30, which is incorporated in the image processing apparatus 20, comprises a first signal conversion means 31 for converting R, G, and B color signal components, which represent each of the picture elements, into YCC luminance and color difference signal components with Formula (16) shown below.

$$Y=0.299 \times R+0.587 \times G+0.114 \times B$$

$$C1=-0.299 \times R-0.587 \times G+0.886 \times B$$

$$C2=0.701 \times R-0.587 \times G-0.114 \times B \quad (16)$$

The interpolating operation apparatus 30 also comprises a cubic spline interpolating operation means 32 for obtaining an interpolated luminance signal component Y', by employing a cubic spline interpolating operation process with respect to the luminance signal components Y, which are among the YCC luminance and color difference signal components having been obtained from the first signal conversion means 31. The interpolating operation apparatus 30 further comprises a B spline interpolating operation means 33 for obtaining interpolated color difference signal components C1' and C2', respectively, by employing a B spline interpolating operation process with respect to the color difference signal components C1 and C2, which are among the YCC luminance and color difference signal components having been obtained from the first signal conversion means 31. The interpolating operation apparatus 30 still further comprises a second signal conversion means 34 for converting the YCC luminance and color difference signal components into color signal components R, G, and B with Formula (17) shown below.

$$R=Y+C2$$

$$G=Y-0.194 \times C2-0.509 \times C2$$

$$B=Y+C1 \quad (17)$$

Specifically, in this embodiment, the luminance and color difference signals interpolating operation means is constituted of the cubic spline interpolating operation means 32 and the B spline interpolating operation means 33.

The cubic spline interpolating operation means 32 calculates the interpolated luminance signal component Y' by employing the aforesaid cubic spline interpolating operation process with respect to the luminance signal components Y. Specifically, the cubic spline interpolating operation means 32 calculates interpolation coefficients $c_{k-2}$, $c_{k-1}$, $c_k$, $c_{k+1}$, and $c_{k+2}$, which respectively correspond to the luminance signal components $Y_{k-2}$, $Y_{k-1}$, $Y_k$, $Y_{k+1}$, and $Y_{k+2}$, in Formula (18) shown below. Formula (18) serves as a third-order cubic spline interpolating operation formula and represents the interpolated luminance signal component Y' corresponding to an interpolation point $X_p$, which is located between original sampling points (picture elements) $X_k$ and $X_{k+1}$. The calculations are made with the formulas shown below.

$$Y'=c_{k-1}Y_{k-1}+c_k Y_k+c_{k+1}Y_{k+1}+c_{k+2}Y_{k+2} \quad (18)$$

$$c_{k-2}=(-t^3+2t^2-t)/2$$

$$c_k=(3t^3-5t^2+2)/2$$

$$c_{k+1}=(-3t^3+4t^2+t)/2$$

$$c_{k+2}=(t^3-t^2)/2$$

in which t, where $0 \leq t \leq 1$, represents the position of the interpolation point $X_p$, the position being taken with respect to the picture element $X_k$ that serves as a reference position, and in the direction heading toward the picture element $X_{k+1}$, the lattice interval being set to be equal to 1.

The B spline interpolating operation means 33 calculates the color difference signal components C1 and C2, respectively, by employing the aforesaid B spline interpolating operation process with respect to the color difference signal components C1 and C2. Specifically, the B spline interpolating operation means 33 calculates interpolation coefficients $b_{k-1}$, $b_k$, $b_{k+1}$, and $b_{k+2}$, which respectively correspond to the color difference signal components $C1_{k-1}$, $C1_k$, $C1_{k+1}$, and $C1_{k+2}$, in Formula (19) shown below. Formula (19) serves as a third-order B spline interpolating operation formula and represents the interpolated color difference signal component C1' corresponding to the interpolation point $X_p$, which is located between the original sampling points $X_k$ and $X_{k+1}$. The calculations are made with the formulas shown below. Also, the component C2 is calculated in the same manner as that for the component C1.

$$C1=b_{k-1}C1_{k-1}+b_kC1_k+b_{k+1}C1_{k+1}+b_{k+2}C1_{k+2} \quad (19)$$

$$b_{k-1}=(-t^3+3t^2-3t+1)/6$$

$$b_k=(3t^3-6t^2+4)/6$$

$$b_{k+1}=(-3t^3+3t^2+3t+1)/6$$

$$b_{k+2}=t^3/6$$

in which t, where $0 \leq t \leq 1$, represents the position of the interpolation point $X_p$, the position being taken with respect to the picture element $X_k$ that serves as a reference position, and in the direction heading toward the picture element $X_{k+1}$, the lattice interval being set to be equal to 1.

An actual image is composed of the picture elements arrayed in two-dimensional directions. Therefore, the cubic spline interpolation coefficients $c_{k-1}$, $c_k$, $c_{k+1}$, and $c_{k+2}$ are calculated for each of two different directions (an i direction and a j direction) of an array of the picture elements in the image. The cubic spline interpolation coefficients $c_{k-1}$, $c_k$, $c_{k+1}$, and $c_{k+2}$ having been calculated in this manner are often represented as the interpolation coefficients Cij. The B spline interpolation coefficients $b_{k-1}$, $b_k$, $b_{k+1}$, and $b_{k+2}$, which have been calculated for each of the i direction and the j direction of the array of the picture elements in the image, are often represented as the interpolation coefficients Bij.

In the image reproducing system provided with this embodiment, the interpolation image signal S' obtained in the manner described above may be directly fed into the image reproducing means 40. Alternatively, the interval of the image signal components of the interpolation image signal S' may be extended such that the interval may become equal to the interval of the image signal components of the original image signal Sorg. In this manner, the interpolation image can be reproduced as an image enlarged from the original image.

How the image reproducing system provided with this embodiment operates will be described hereinbelow.

Firstly, the image processing apparatus 20 reads the primary image signal Sorg from the image signal storing device 10. Also, in order to obtain the secondary image signal, which represents an enlarged image corresponding to the size of the photographic paper used in the image reproducing means 40, the image processing apparatus 20 feeds the primary image signal Sorg into the interpolating operation apparatus 30 incorporated in the image processing apparatus 20.

In the interpolating operation apparatus 30, the primary image signal Sorg(R,G,B) is fed into the first signal conversion means 31. In the first signal conversion means 31, the R, G, and B color signal components, which represent each of the picture elements in the original color image, are converted into the luminance signal component Y and the color difference signal components C1, C2. In this manner, the luminance signal components Y and the color difference signal components C1, C2, which correspond to the picture elements in the original color image, are obtained.

Thereafter, the luminance signal components Y are fed into the cubic spline interpolating operation means 32. The color difference signal components C1, C2 are fed into the B spline interpolating operation means 33.

The cubic spline interpolating operation means 32 and the B spline interpolating operation means 33 set the values of t in the respective interpolation coefficients in accordance with the size of the photographic paper, which is used in the image reproducing means 40. For example, in cases where an image size enlargement scale factor of 2 is specified, values of 0.5 and 1.0 are set as the values of t. In cases where an image size enlargement scale factor of 4 is specified, values of 0.25, 0.5, 0.75, and 1.0 are set as the values of t. In cases where an image size enlargement scale factor of 10 is specified, values of 0.1, 0.2, . . . , 1.0 are set as the values of t. The interpolated signal components are calculated in accordance with the thus set values of t. The interpolated luminance signal components Y', which have been obtained in the cubic spline interpolating operation means 32, and the interpolated color difference signal components C1', C2', which have been obtained in the B spline interpolating operation means 33, are fed into the second signal conversion means 34. In the second signal conversion means 34, each of the interpolated luminance signal components Y' and the corresponding interpolated color difference signal components C1', C2' are converted into the interpolated color signal components R', G', and B' with Formula (17) shown above.

The interpolated color signal components R', G', and B', which have been obtained in the interpolating operation apparatus 30, serve as the color signal components in the interpolation image signal S'. The interpolation image signal S' (R',G',B') is fed into the image reproducing means 40.

The image reproducing means 40 reproduces a visible image from the received interpolation image signal S'. The visible image reproduced in this manner is the one represented by the interpolation image signal having been obtained by employing the cubic spline interpolating operation process as the interpolating operation process, which attaches importance to sharpness, with respect to the luminance signal components, and by employing the B spline interpolating operation as the interpolating operation process, which attaches importance to stability, with respect to the color difference signal components. In this manner, by the utilization of the interpolating operation apparatus 30 in accordance with the present invention, the image size can be enlarged or reduced such that the sharpness of the original image may be kept high and noise due to hue variations may be kept small.

In the image reproducing system provided with this embodiment, the interpolating operation apparatus 30 utilizes the primary image signal having been previously stored in the image signal storing device 10. However, the interpolating operation apparatus in accordance with the present invention is not limited to this embodiment. For example, an image signal representing an image, which has been detected by using an image read-out apparatus, may be utilized.

Also, in this embodiment, as the signal components in the luminance-color difference space, the YCC luminance and color difference signal components are employed. Alternatively, luminance and color difference signal components, which are represented by L*a*b*, L*u*v*, or the like, may be employed.

FIG. 3 is a schematic block diagram showing an image reproducing system provided with an interpolating operation apparatus 30', which is a second embodiment of the interpolating operation apparatus for carrying out the interpolating operation method for a color image signal in accordance with the present invention.

As for the second embodiment, only the features different from those in the interpolating operation apparatus 30, which is the first embodiment, will be described hereinbelow. In FIG. 3, similar elements are numbered with the same reference numerals with respect to FIG. 1.

The interpolating operation apparatus 30' is provided with a flesh-color judgment means 36 for making a judgment as to whether each of the picture elements is or is not the one which represents flesh color. The judgment is made from the luminance and color difference signal components, which are received from the first signal conversion means 31. The flesh-color judgment means 36 receives the luminance and color difference signal components (Y, $C_1$, $C_2$), which have been obtained from the conversion of the color signal components (R, G, B) carried out by the first signal conversion means 31. The flesh-color judgment means 36 makes a judgment from the color difference signal components $C_1$ and $C_2$ as to whether each of the picture elements is or is not the one which represents flesh color. A luminance signal component $y_2$, which corresponds to a picture element having been judged as being the one representing flesh color, is fed into the B spline interpolating operation means 33. A luminance signal component $y_1$, which corresponds to a picture element having been judged as not being the one representing flesh color, is fed into the cubic spline interpolating operation means 32.

In the flesh-color judgment means 36, the judgment as to whether each of the picture elements is or is not the one which represents flesh color is made in the manner described below. Specifically, values of V and θ, which represent the position of a picture element of interest in the chromaticity diagram, are calculated from the color difference signal components $C_1$ and $C_2$, which have been obtained from the first signal conversion means 31, and with the formulas shown below.

$$V = \sqrt{C_1^2 + C_2^2},$$

$$\theta = \tan(C_2/C_1)$$

The ranges of V and θ, which are recognized as being flesh color, are found experimentally, and the information representing the found ranges is stored in the flesh-color judgment means 36. For example, in cases where the color is recognized as being flesh color when V1<V<V2 and, at the same time, θ1<θ<θ2, the flesh-color judgment means 36 makes a judgment as to whether the values of V and θ, which have been calculated from the color difference signal components $C_1$ and $C_2$ with the formulas shown above, fall or do not fall within the specified ranges. Specifically, it is judged that, in cases where the values of V and θ fall within the specified ranges, the color is flesh color. Also, it is judged that, in cases where the values of V and θ do not fall within the specified ranges, the color is not flesh color.

In cases where it has been judged, from the color difference signal components $C_1$ and $C_2$ corresponding to a predetermined picture element, that the picture element represents flesh color, the luminance signal component $y_2$ corresponding to the picture element is fed into the B spline interpolating operation means 33 and subjected to the interpolating operation process, which attaches importance to stability. In cases where it has been judged that the picture element does not represent flesh color, the luminance signal component $y_1$ corresponding to the picture element is fed into the cubic spline interpolating operation means 32 and subjected to the interpolating operation process, which attaches importance to sharpness. At this time, as in the first embodiment, the color difference signal components $C_1$ and $C_2$ are fed into the B spline interpolating operation means 33 and subjected to the interpolating operation process, which attaches importance to stability. In this manner, by the utilization of the interpolating operation apparatus 30' in accordance with the present invention, the image size can be enlarged or reduced such that the sharpness of the original image may be kept high, such that noise due to hue variations may be kept small, and such that the graininess of the flesh-color region may be kept small.

BRIEF DESCRIPTION OF THE DRAWINGS

FIG. 1 is a schematic block diagram showing an image reproducing system provided with a first embodiment of the interpolating operation apparatus for carrying out the interpolating operation method for a color image signal in accordance with the present invention.

FIG. 2 is an explanatory graph showing how interpolated image signal components are obtained with a cubic spline interpolating operation from original image signal components, which are sampled with a period of an equal interval and represent sampling points (picture elements) arrayed in one direction.

FIG. 3 is a schematic block diagram showing an image reproducing system provided with a second embodiment of the interpolating operation apparatus for carrying out the interpolating operation method for a color image signal in accordance with the present invention.

Figure 1:
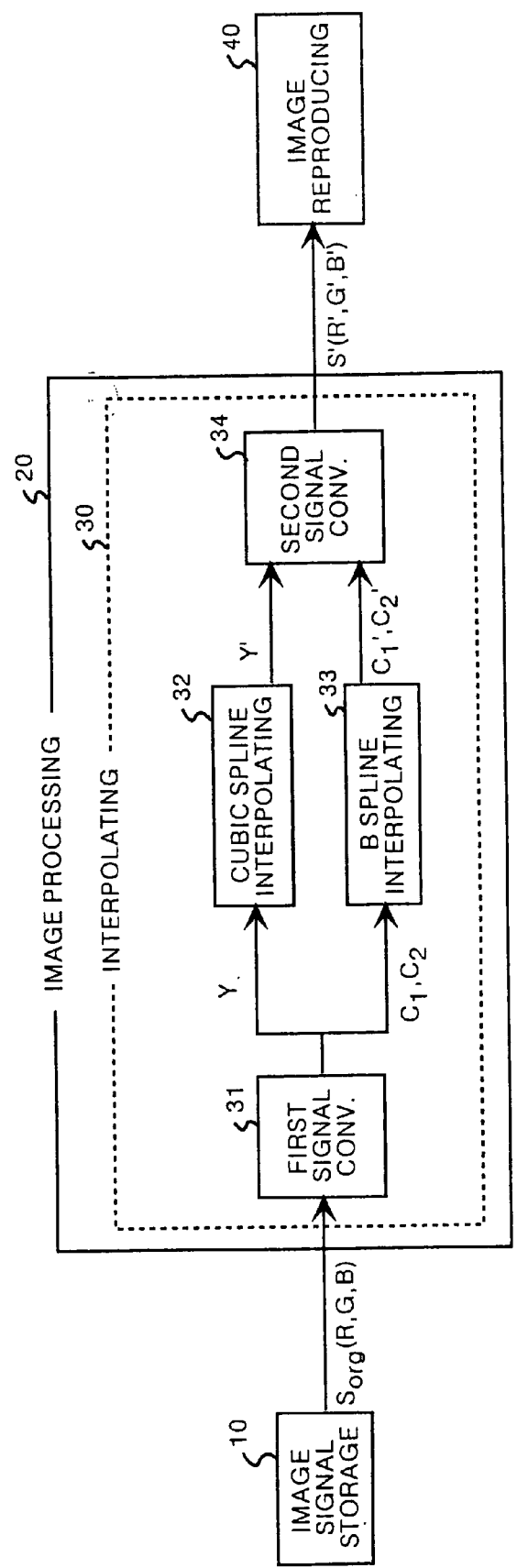
FIG. 1
Figure 2:
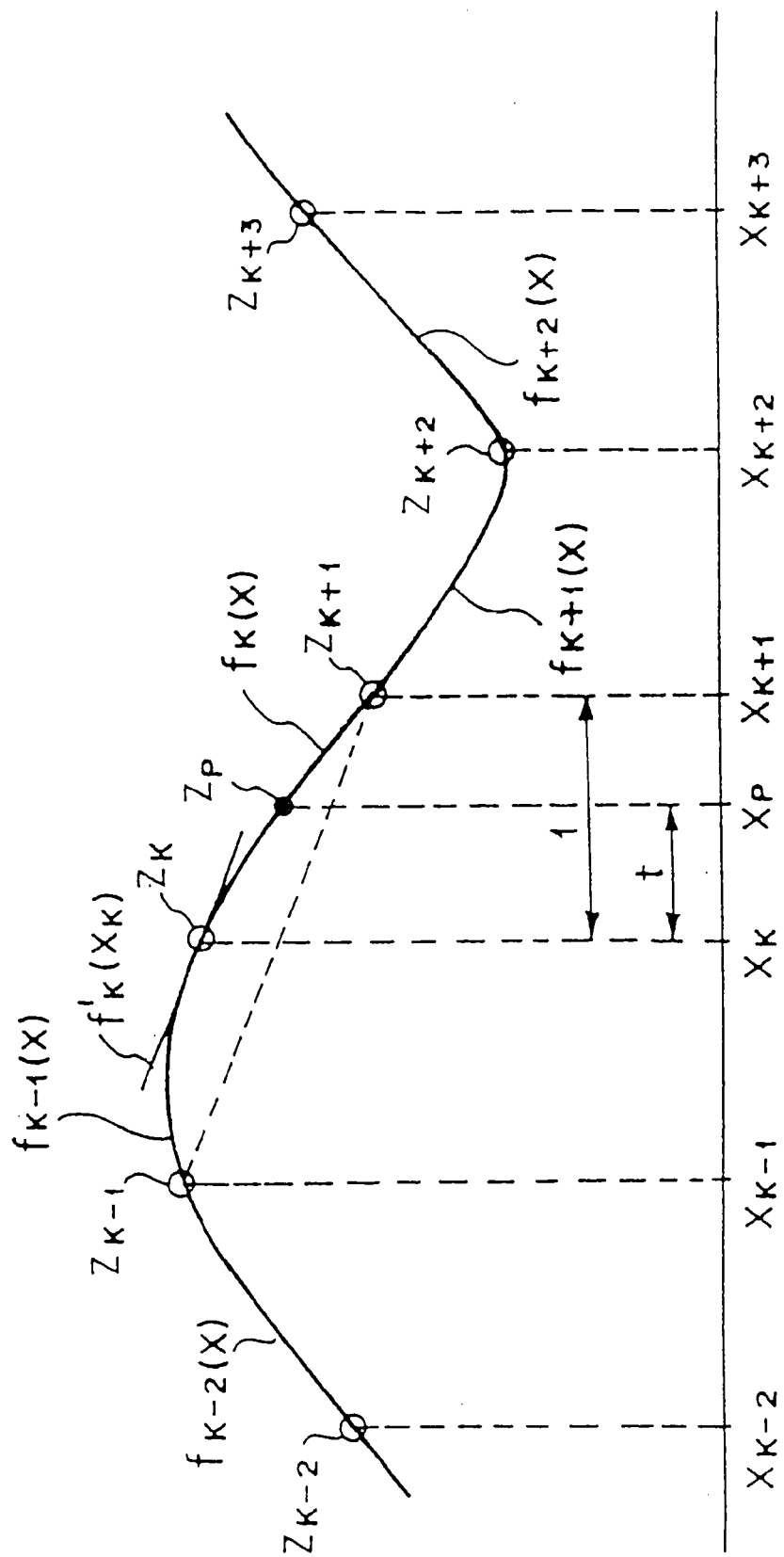
FIG. 2
Figure 3:
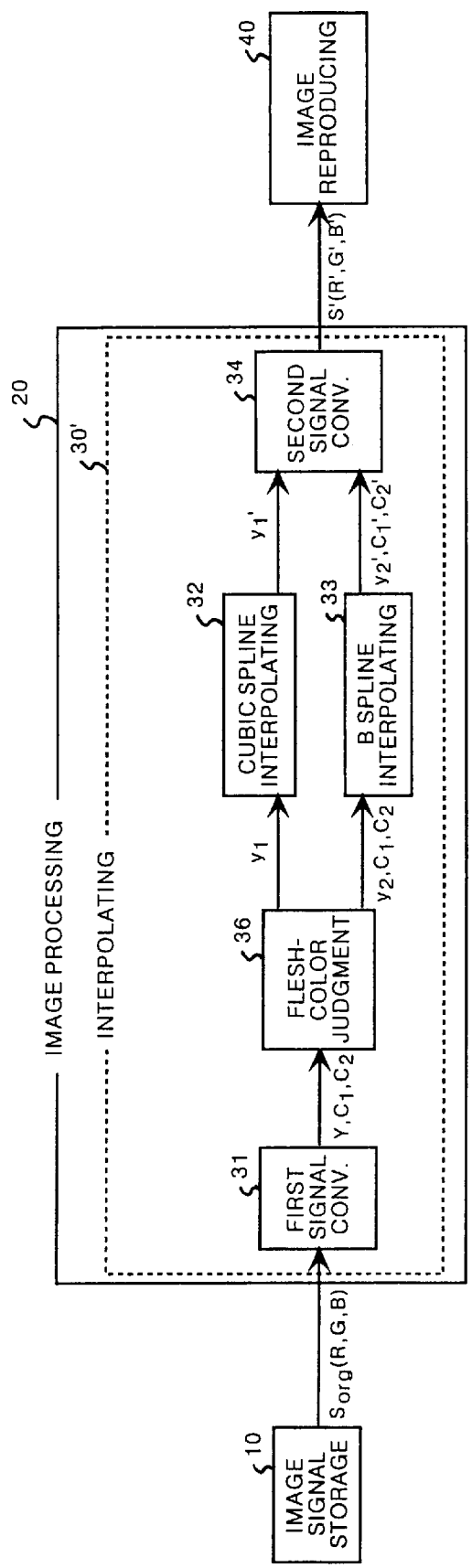
FIG. 3

EXPLANATION OF REFERENCE NUMERALS 10 image signal storing device
20 image processing apparatus
30 interpolating operation apparatus
31 first signal conversion means
32 cubic spline interpolating operation means
33 B spline interpolating operation means
34 second signal conversion means
40 image reproducing means

What is claimed is:

1. An interpolating operation method for a color image signal composed of image signal components representing picture elements in a color image, the method comprising the steps of:

i) converting original R, G, and B color signal components, representing each of the picture elements of the original image signal, into a luminance signal component and a color difference signal component for each of the picture elements;

ii) obtaining an interpolated luminance signal component from the converted luminance signal component by employing a first interpolating procedure for enhancing sharpness of the interpolated luminance signal components;

iii) obtaining an interpolated color difference signal component from the converted color difference signal component by employing a second interpolating procedure for enhancing stability of the interpolated color difference signal components; and iv) converting said interpolated luminance signal component and said interpolated color difference signal component into supplemental R, G, and B color signal components to obtain an interpolation image signal, composed of said supplemental R,G, and B color signal components, for supplementing the original R, G, and B signal components.

2. A method as defined in claim 1 wherein said first interpolating procedure comprises a process utilizing a cubic spline interpolating operation, and said second procedure comprises a process utilizing a B spline interpolating operation.

3. An interpolating operation method for a color image signal composed of image signal components representing picture elements in a color image, the method comprising the steps of:

i) converting original R, G, and B color signal components, representing each of the picture elements of the original image signal, into a luminance signal component and a color difference signal component for each of the picture elements;

ii) obtaining an interpolated luminance signal component from the converted luminance signal component by:

a) employing one interpolating procedure for enhancing stability of the interpolated luminance signal components with regard to particular ones of the picture elements representing flesh color in the original color image, and b) employing another interpolating procedure for enhancing sharpness of the interpolated luminance signal components with regard to remaining ones of the picture elements other than the picture elements representing flesh color in the original color image, iii) obtaining an interpolated color difference signal component from the converted color difference signal component by employing an interpolating operation procedure for enhancing stability of the interpolated color difference signal components; and iv) converting said interpolated luminance signal component and said interpolated color difference signal component into supplemental R, G, and B color signal components to obtain an interpolation image signal, composed of said supplemental R, G, and B color signal components, for supplementing the original R, G, and B signal components.

4. A method as defined in claim 3 wherein said first interpolating procedure comprises a process utilizing a cubic spline interpolating operation, and said second interpolating procedure comprises a process utilizing a B spline interpolating operation.

5. An interpolating operation apparatus for a color image signal composed of image signal components representing picture elements in a color image, the apparatus comprising:

i) a first converter for converting original R, G, and B color signal components, representing each of the picture elements of the original image signal, into a luminance signal component and a color difference signal component, for each of the picture elements;

ii) an interpolator accepting input of the converted luminance and color difference signals and outputting:

an interpolated luminance signal component by employing a first interpolating procedure for enhancing estimated sharpness of the interpolated luminance signal component; and an interpolated color difference signal component by employing a second interpolating procedure for enhancing stability of the interpolated color difference signal component; and iii) a second converter for converting said interpolated luminance signal component and said interpolated color difference signal component into supplemental R, G, and B color signals, to obtain an interpolation image signal, composed of said supplemental R, G, and B color signal components, for supplementing the original R, G, and B signal components.

6. An apparatus as defined in claim 5 wherein the interpolator of said luminance and color difference signals employs a cubic spline interpolating operation as said first interpolating procedure and employs a B spline interpolating operation as said second interpolating procedure.

7. An interpolating operation apparatus for a color image signal composed of image signal components representing picture elements in a color image, the apparatus comprising:

i) a first converter for converting original R, G, and B color signal components, representing each of the picture elements of the original image signal, into a luminance signal component and a color difference signal component for each of the picture elements;

ii) an interpolator accepting an input of the converted luminance and color difference signals and outputting an interpolated luminance signal component by:

a) employing one interpolating procedure for enhancing stability of the interpolated luminance signal components with regard to particular ones of the picture elements representing flesh color in the original color image, and b) employing another interpolating procedure for enhancing sharpness of the interpolated luminance signal components with regard to remaining ones of the picture elements other than the picture elements representing flesh color among the picture elements in the color image, and obtaining an interpolated color difference signal component from the converted color difference signal component by employing an interpolating operation, and iii) a second converter for converting said interpolated luminance signal component and said interpolated color difference signal component into supplemental R, G, and B color signal components to obtain an interpolation image signal, composed of said supplemental R, G, and B color signal components.

8. An apparatus as defined in claim 7 wherein said luminance and color difference signals interpolating operation means employs a cubic spline interpolating operation as said interpolating operations process, which attaches importance to sharpness, and employs a B spline interpolating operation as said interpolating operation process, which attaches importance to stability.

9. A method for processing a color image composed of pixels, the method comprising the steps of:

separating an original image signal of the color image into a luminance signal component for each pixel and color difference signal components associated with corresponding primary colors for each pixel;

interpolating the separated luminance signal component in accordance with a first interpolating procedure for enhancing sharpness of the interpolated luminance signal components;

interpolating the separated color difference signal components in accordance with a second interpolating procedure for enhancing stability of the interpolated color difference signal components; and converting said interpolated luminance signal component and said interpolated color difference signal components into a supplemental image signal, for supplementing the original image signal to improve resolution of a resultant image composed of the supplemental image signal and the original image signal.

10. The method according to claim 9 wherein the first interpolation procedure is applied to the luminance signal components of pixels that are not associated with flesh color of the original image.

11. The method according to claim 9 wherein the first interpolation procedure includes employing one interpolating procedure for enhancing stability of the interpolated luminance signal components with regard to particular ones of the picture elements representing flesh color in the original color image, and employing another interpolating procedure for enhancing sharpness of the interpolated luminance signal components with regard to remaining ones of the picture elements other than the picture elements representing flesh color in the original color image.

12. The method according to claim 9 wherein the first procedure comprises a cubic spline interpolation operation.

13. The method according to claim 12 wherein the second procedure comprises a B spline interpolation operation.

14. The method according to claim 9 wherein the first procedure emphasizes discontinuity of the signal values of the separated luminance signal components for different pixels in the original image signal.

15. The method according to claim 9 wherein the second procedure emphasizes continuity of the signal values of the separated color difference signal components for different pixels in the original image signal.

16. The method according to claim 9 wherein the primary colors represent red, green, and blue.

17. A system for processing a color image composed of pixels, the system comprising:

a separator for separating an original image signal of the color image into a luminance signal component for each pixel and color difference signal components associated with corresponding primary colors for each pixel;

a first interpolator for interpolating the separated luminance signal component in accordance with a first interpolating procedure for enhancing sharpness of the interpolated luminance signal components;

a second interpolator for interpolating the separated color difference signal components in accordance with a second interpolating procedure for enhancing stability of the interpolated color difference signal components; and a converter for converting said interpolated luminance signal component and said interpolated color difference signal components into a supplemental image signal, for supplementing the original image signal to improve resolution of a resultant image signal composed of the original image signal and the supplemental image signal.

18. The system according to claim 17 wherein the first interpolator interpolates the luminance signal components of pixels that are not associated with flesh color of the original image.

19. The system according to claim 17 wherein the first procedure comprises a cubic spline interpolation operation.

20. The system according to claim 19 wherein the second procedure comprises a B spline interpolation operation.

21. The system according to claim 17 wherein the first procedure emphasizes discontinuity of the signal values of the separated luminance signal components for different pixels in the original image signal.

22. The system according to claim 17 wherein the second procedure emphasizes continuity of the signal values of the separated color difference signal components for different pixels in the original image signal.

23. The system according to claim 17 wherein the primary colors represent red, green, and blue.

* * * * *